United States Patent [19]

Smith

[11] Patent Number: 4,544,187
[45] Date of Patent: Oct. 1, 1985

[54] HOSE END FITTING

[75] Inventor: Richard D. Smith, Yorkshire, England

[73] Assignee: Internationale Octrooi Maatschappij "Octropa" B.V., Rotterdam, Netherlands

[21] Appl. No.: 633,678

[22] Filed: Jul. 25, 1984

Related U.S. Application Data

[63] Continuation of Ser. No. 386,759, Jun. 9, 1982, abandoned.

[30] Foreign Application Priority Data

Jun. 10, 1981 [GB] United Kingdom ............. 8117761

[51] Int. Cl.$^4$ .............................................. F16L 33/20
[52] U.S. Cl. .................................... 285/256; 29/508; 29/516; 285/259
[58] Field of Search ............. 285/256, 259, 258, 257; 29/508, 516

[56] References Cited

U.S. PATENT DOCUMENTS 2,341,003  2/1944  Watson ................................ 285/256
3,549,180 12/1970  MacWilliam ...................... 285/256
3,589,752  6/1971  Spencer ............................. 285/257

FOREIGN PATENT DOCUMENTS 1179063 10/1964 Fed. Rep. of Germany.
7337445  1/1974 Fed. Rep. of Germany.
2926215  1/1980 Fed. Rep. of Germany.
1093615  5/1955 France ............................. 285/256
 561283  5/1944 United Kingdom ............. 285/256
 667181  2/1952 United Kingdom ............. 285/256
1248395  9/1971 United Kingdom ............. 285/256

Primary Examiner—Thomas F. Callaghan
Attorney, Agent, or Firm—Cushman, Darby & Cushman

[57] ABSTRACT

A one piece hose end fitting in which a ferrule is secured by swaging to an insert prior to the fitting being inserted in the end of a hose has a ferrule comprising a ferrule body and a ferrule collar intermediate the body and the insert, the ferrule body before swaging having an internal bore throughout its length corresponding to the bore required to be swaged onto the hose and the ferrule collar fitting within the body before swaging and being adapted to be swaged onto the insert when the body is swaged onto the collar.

3 Claims, 3 Drawing Figures

HOSE END FITTING

This is a continuation of application Ser. No. 386,759, filed June 9, 1982, now abandoned.

This invention relates to a hose end fitting of the type having an insert within the end of the hose secured by a ferrule which is compressed or swaged to grip the end of the hose between the ferrule and the insert. The invention is particularly related to a hose end fitting of this type in which the ferrule is attached to the insert prior to the insert being inserted in the end of the hose. These so-called one-piece fittings are often preferred for repair work in the field to eliminate the possibility of the use of an incorrect ferrule and insert combination.

To anchor the ferrule to the insert the end of ferrule is swaged into a recess on the insert, this first swage attaching the ferrule to the insert prior to assembling the fitting to the end of a hose. Ferrules are commonly machined from solid or tubular bar material having an internal diameter less than the diameter of that part of the ferrule which has to pass over the hose end. The machining provides an internal rib on the ferrule which is anchored in the recess on the insert by the first swage.

In an effort to minimise machining, and hence cost, it has been proposed to provide ferrules manufactured from tubular material having an inner bore diameter corresponding to that desired in that part of the ferrule which is swaged onto the hose.

Such ferrules also have the advantage that the force required to swage the fitting to the hose end is not too great and can be effected with portable equipment. The first swaging of the ferrule to anchor it on the insert which is the more difficult to effect can be carried out under factory conditions.

Such ferrules cannot be substituted for fully machined ferrules having an inwardly extending rib at one end which is swaged into the recess on the insert since the ferrule cannot be satisfactorily swaged in a sufficient distance to engage the recess on the insert. A different insert is required in which the diameter of the recess and the shoulders thereof are increased to suit the swaging capability of the ferrule.

According to the present invention there is provided a hose end fitting comprising an insert having a tail portion insertable within the end of a hose and an external annular recess in that part of the insert adjacent the end of the tail portion, a ferrule body having a bore throughout its length which corresponds with the bore of that part of the ferrule to be swaged onto the outside of the end of the hose, and a ferrule collar having an inwardly extending annular rib and an external annular recess, the diameter of the rib and recess of the ferrule collar being such that the ferrule body can be swaged into the recess of the collar and the collar rib into the recess of the insert to attach the ferrule body to the insert. Thus, a ferrule body made from tubular material with a minimum of machining and wasted material can be adapted by means of the ferrule collar to be used with an insert designed for use with a ferrule with a machined internal rib and the benefit of such a ferrule body can be realised without the need for special inserts.

The ferrule body and ferrule collar can be swaged onto the insert prior to the fitting being inserted on the end of a hose. After the fitting is inserted on the hose the ferrule body can be swaged to secure the hose between the insert and the ferrule.

If desired the internal bore of the ferrule body can be provided with one or more annular recesses to enhance the grip of the ferrule body on the outside of the end of the hose.

The width of the recess on an insert which is designed for use with a fully machined ferrule having an internal rib is not usually wide enough for a tubular ferrule body to be satisfactorily swaged into. Preferably the width of the external recess on the ferrule collar is therefore wider than the width of the recess on the insert, i.e. the width of the annular rib on the ferrule collar, by an amount substantially equal to one-half the thickness of the ferrule body.

One side of the recess on the collar preferably has a larger diameter than the bore of the ferrule body to provide an abutment for the ferrule body and assist in obtaining their correct relative positions prior to swaging.

The invention will now be more particularly described with reference to the accompanying diagrammatic drawings in which.

Figure 1:
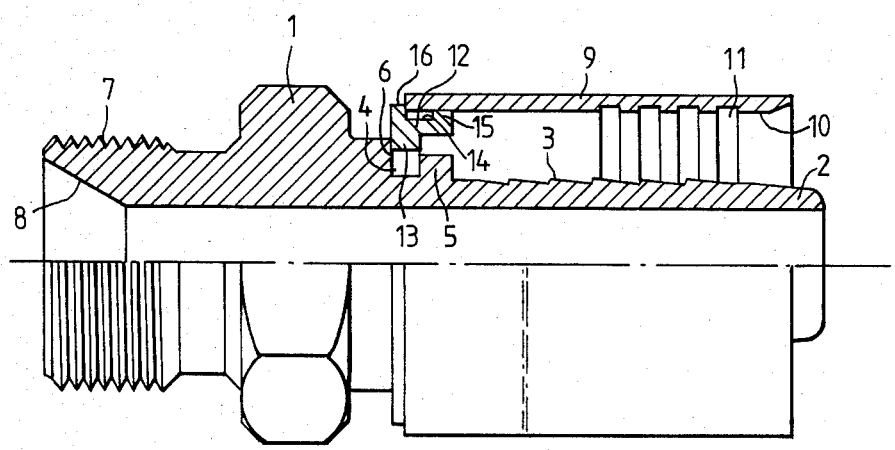
FIG. 1 is a partially cross-sectioned longitudinal view of an assembled fitting according to the invention before swaging.

Referring to FIG. 1 the hose end fitting comprises an insert 1 which can be used with a fully machined ferrule and having at one end a tail portion 2 adapted to be inserted within the end of a hose. The tail is provided with a plurality of annular projections or teeth 3 to enhance the grip of the insert within the bore of the hose. Adjacent the tail portion the insert is provided with an annular recess 4 between a shoulder 5 and an abutment 6 and the other end of the insert is provided with a male threaded termination 7 having a tapered bore 8. It will be well understood that a number of different terminations are possible.

A ferrule body 9 has a bore 10 throughout its length which is that required to pass over the outside of the hose end and be swaged to grip the hose between the ferrule body and the tail portion of the insert. To enhance the grip of the ferrule body on the hose the bore 10 is provided with a plurality of recesses 11 machined therein.

An annular ferrule collar 12 has an internal annular rib 13 of a width to be received into the recess 4 of the insert. The rib 13 has an internal diameter to allow the collar to pass over the shoulder 5 of the insert and engage the abutment 6. The ferrule collar is also provided with an external annular recess 14 defined between a shoulder 15 and an abutment 16. The external diameter of the shoulder 15 is such as to allow the ferrule body to pass over the collar to abut the abutment 16. The recess 14 has a width greater than the width of the recess 4 by an amount substantially that of half the thickness of the ferrule body.

Figure 2:
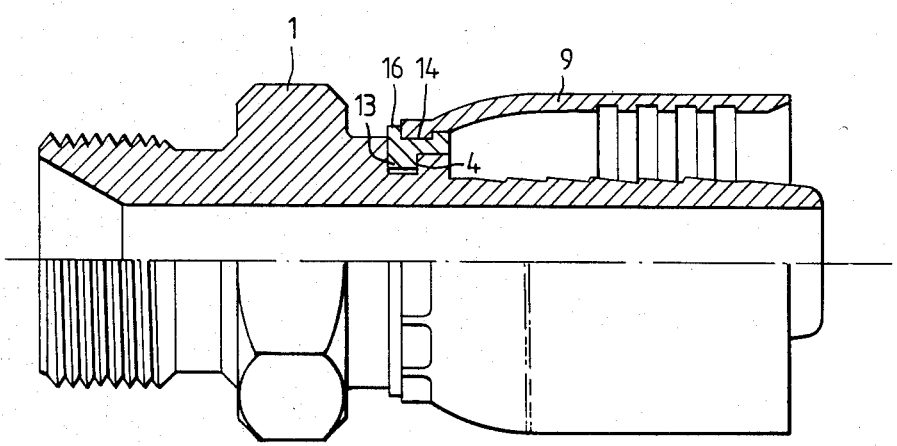
FIG. 2 is a view similar to FIG. 1 showing the fitting after swaging the assembled parts together.

The ferrule body, ferrule collar and insert are assembled as shown in FIG. 1 with the ferrule body in engagement with abutment 16 and the collar in engagement with the abutment 6. In this position the end of the ferrule body is swaged inwardly to swage the ferrule into the recess 14 of the collar and the rib 13 of the collar into the recess 4 of the insert as shown in FIG. 2. The hose end fitting is now in one piece and ready for the user to apply to the end of a hose.

Figure 3:
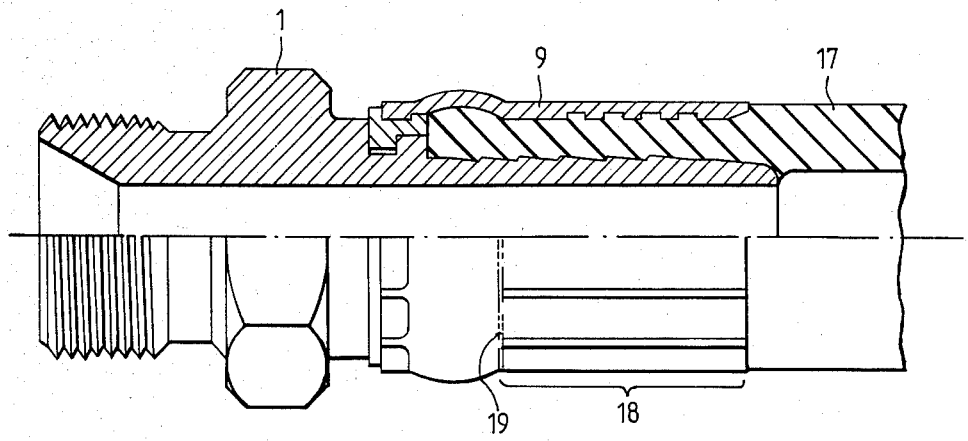
FIG. 3 is a view similar to FIGS. 1 and 2 showing the fitting swaged on the end of a hose.

The user inserts the tail portion of the insert as far as possible into the end of the hose 17 and the ferrule body is swaged on to the hose as shown in FIG. 3. This second swaging operation is preferably confined to the free end portion 18 of the ferrule body to avoid undue swaging of the already swaged end. The zone to be swaged by the user can conveniently be indicated by a guide line 19 on the outside of the ferrule body.

The invention thus provides a ferrule the major body portion of which can be economically manufactured and which by virtue of the ferrule collar can be utilised with a standard insert designed for use with a fully machined ferrule thereby avoiding the need for special inserts. In use, the performance of the fittings has been shown to be equally as reliable as that of fitting comprising only a ferrule and insert.

I claim:

1. An assembly for providing a preassembled, unitary hose end fitting which after being crimped to transform said assembly into said fitting can be easily field-installed by coaxially inserting a hose end into an axially-opening annular socket defined radially between a radially inner tubular fitting insert tail portion and a radially outer tubular ferrule body free end portion, and swaging the ferrule body free end portion radially inwards toward the fitting insert tail portion, said assembly comprising:
a hose end fitting body having an axially extending tubular tail portion based thereon, there being a plurality of radially outwardly projecting, axially spaced teeth formed externally on said tubular tail portion, and there being formed on said hose end fitting body axially adjacent said tubular tail portion:
  a circumferential external rib providing an annular shoulder having a greater outer diameter than said tubular tail portion has axially adjacent said annular shoulder, and
  axially separated from said tubular tail portion by said annular shoulder, a circumferentially extending, radially outwardly opening annular recess;
an annular ferrule collar of swageable material including:
  a circumferentially extending radially inwardly projecting internal annular rib initially having an internal diameter which is at least slightly greater than the outer diameter of said annular shoulder and a length axially of said annular ferrule that is sufficiently short as to receive said annular shoulder upon radially inward swaging of said annular ferrule collar, and,
  axially adjacent said internal annular rib, a socket end wall-providing portion initially having an internal diameter which is less than that of said internal annular rib and which is arranged to radially abut said annular shoulder upon radially inward swaging of said annular ferrule collar,
  located axially toward a same end of said annular ferrule collar as said internal annular rib, an external abutment initially having an outer diameter which is greater than the internal diameter, at a corresponding end, of a ferrule body which is to be swaged thereto,
  located axially toward an opposite end of said annular ferrule collar from said same end, a circumferentially extending, radially outwardly projecting shoulder initially having an outer diameter which is not greater than the internal diameter at said corresponding end, of said ferule body, and
  axially between said external abutment and said shoulder of said annular ferrule collar, a circumferentially extending, radially outwardly opening external annular recess;
a tubular ferrule body of swageable material, said ferrule having:
  a base portion adjoining said corresponding end thereof, and
  a free end portion extending axially from said base portion to an opposite end thereof,
there being a plurality of axially spaced radially inwardly opening circumferentially extending recesses provided internally on said free end portion of said tubular ferrule body;
said tubular ferrule body being constructed and arranged to be slid at said corresponding end thereof coaxially telescopically onto said annular ferrule collar until said corresponding end axially abuts said abutment;
said annular ferrule collar being constructed and arranged to be slid telescopically onto said hose end fitting body, over said tail portion first, until said internal annular rib of said annular ferrule collar radially surrounds said annular recess in said hose end fitting body, so that upon applying sufficient radially inward crimping force on said tubular ferrule body and annular ferrule collar, adjacent said corresponding end of said tubular ferrule body, one may thereby simultaneously unite said hose end fitting body and said tubular ferrule body via said annular ferrule collar, and create said axially-opening annular socket, by:
  deforming said internal annular rib of said annular ferrule collar into said annular recess on said hose end fitting body,
  deforming said socket endwall-providing portion into radial abutment with said annular shoulder on said hose end fitting body; and
  deforming said tubular ferrule body adjacent said corresponding end thereof into said external annular recess in said annular ferrule collar.

2. A method for providing a preassembled, unitary hose end fitting which can be easily field-installed by coaxially inserting a hose end into an axially-opening annular socket defined radially between a radially inner tubular fitting insert tail portion and a radially outer tubular ferrule body free end portion, and swaging the ferrule body free end portion radially inwards towards the fitting insert tail portion, said method comprising:
providing a hose end fitting body having an axially extending tubular tail portion based thereon, there being a plurality of radially outwardly projecting, axially spaced teeth formed externally on said tubular tail portion, and there being formed on said hose end fitting body axially adjacent said tubular tail portion:
  a circumferential external rib providing an annular shoulder having a greater outer diameter than said tubular tail portion has axially adjacent said annular shoulder, and,
axially separated from said tubular tail portion by said annular shoulder, a circumferentially extending, radially outwardly opening annular recess; providing an annular ferrule collar of swageable material including:
- a circumferentially extending radially inwardly projecting internal annular rib initially having an internal diameter which is at least slightly greater than the outer diameter of said annular shoulder and a length axially of said annular ferrule that is sufficiently short as to receive said annular shoulder upon radially inward swaging of said annular ferrule collar, and,
- axially adjacent said internal annular rib, a socket end wall-providing portion initially having an internal diameter which is less than that of said internal annular rib and which is arranged to radially abut said annular shoulder upon radially inward swaging of said annular ferrule collar,
- located axially toward a same end of said annular ferrule collar as said internal annular rib, an external abutment initially having an outer diameter which is greater than the internal diameter, at a corresponding end, of a ferrule body which is to be swaged thereto,
- located axially toward an opposite end of said annular ferrule collar from said same end, a circumferentially extending, radially outwardly projecting shoulder initially having an outer diameter which is not greater than the internal diameter at said corresponding end, of said ferrule body, and
- axially between said external abutment and said shoulder of said annular ferrule collar, a circumferentially extending, radially outwardly opening external annular recess;

providing a said tubular ferrule body of swageable material having:
- a base portion adjoining said corresponding end thereof, and
- a free end portion extending axially from said base portion to an opposite end thereof,
- there being a plurality of axially spaced radially inwardly opening circumferentially extending recesses provided internally on said free end portion of said tubular ferrule body;

sliding said tubular ferrule body at said corresponding end thereof coaxially telescopically onto said annular ferrule collar until said corresponding end axially abuts said abutment;

sliding said annular ferrule collar telescopically onto said hose end fitting body, over said tail portion first, until said internal annular rib of said annular ferrule collar radially surrounds said annular recess in said hose end fitting body; and applying radially inward crimping force on said tubular ferrule body and annular ferrule collar, adjacent said corresponding end of said tubular ferrule body, thereby simultaneously uniting said hose end fitting body and said tubular ferrule body via said annular ferrule collar, and creating said axially-opening annular socket, by:
- deforming said internal annular rib of said annular ferrule collar into said annular recess on said hose end fitting,
- deforming said socket endwall-providing portion into radial abutment with said annular shoulder on said hose end fitting body; and
- deforming said tubular ferrule body adjacent said corresponding end thereof into said external annular recess in said annular ferrule collar.

3. A preassembled, unitary hose end fitting produced by the method of claim 2.

* * * * *